(12) United States Patent
Petrovic (10) Patent No.: US 8,681,890 B2
(45) Date of Patent: Mar. 25, 2014

(54) METHOD AND APPARATUS FOR REAL TIME MULTIPLEXING WITH RECEIVER AND ANTENNA ARRAY ELEMENTS

(75) Inventor: Branislav Petrovic, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 229 days.

(21) Appl. No.: 12/882,879

(22) Filed: Sep. 15, 2010

(65) Prior Publication Data

US 2011/0299630 A1 Dec. 8, 2011

Related U.S. Application Data (60) Provisional application No. 61/352,268, filed on Jun. 7, 2010.

(51) Int. Cl.
*H04B 7/02* (2006.01)

(52) U.S. Cl.
USPC ............ 375/267; 375/347; 375/348; 375/350

(58) Field of Classification Search
USPC .................................................. 375/267, 347
See application file for complete search history.

(56) References Cited

U.S. PATENT DOCUMENTS

| | | | |
|---|---|---|---|
| 6,002,672 A | 12/1999 | Todd | |
| 6,381,286 B1 * | 4/2002 | Wilkinson et al. | 375/296 |
| 6,430,235 B1 | 8/2002 | O'Shea et al. | |
| 7,486,747 B1 | 2/2009 | Bagley et al. | |
| 7,508,737 B1 * | 3/2009 | Alexandru | 367/103 |
| 8,130,693 B2 * | 3/2012 | Miller et al. | 370/316 |
| 2003/0223391 A1 | 12/2003 | Malaender et al. | |
| 2005/0105632 A1 | 5/2005 | Catreux-Erces et al. | |
| 2005/0141406 A1 | 6/2005 | Maltsev et al. | |
| 2006/0072514 A1 | 4/2006 | Kent et al. | |
| 2006/0153319 A1 * | 7/2006 | Gorsuch et al. | 375/347 |
| 2007/0218854 A1 * | 9/2007 | Lawrence et al. | 455/310 |
| 2008/0075194 A1 | 3/2008 | Ravi et al. | |
| 2008/0081567 A1 * | 4/2008 | Rofougaran | 455/78 |
| 2008/0084951 A1 | 4/2008 | Chen et al. | |
| 2008/0155636 A1 | 6/2008 | Cruz et al. | |
| 2009/0034448 A1 | 2/2009 | Miller et al. | |
| 2009/0046790 A1 | 2/2009 | Soliman | |
| 2009/0103593 A1 | 4/2009 | Bergamo | |
| 2009/0110088 A1 | 4/2009 | Di Giandomenico et al. | |
| 2009/0245431 A1 | 10/2009 | Challa et al. | |
| 2010/0093282 A1 * | 4/2010 | Martikkala et al. | 455/63.4 |
| 2010/0123621 A1 * | 5/2010 | Craig et al. | 342/354 |

OTHER PUBLICATIONS

United States Patent and Trademark Office, Office Action, U.S. Appl. No. 12/889,967, Issued Sep. 11, 2012.

* cited by examiner

*Primary Examiner* — Qutbuddin Ghulamali
(74) *Attorney, Agent, or Firm* — Bruce Greenhaus; Richard Bachand (57) ABSTRACT

A method of signal processing, or corresponding apparatus, includes providing multiple analog receive signals at respective antennas and selecting one antenna at a time in an iterative manner, to cycle through the antennas and provide a multiplexed analog signal. The multiplexed analog signal is filtered at a filter to pass a predetermined frequency band. The multiplexed analog signal is sampled at a single analog to digital converter to generate a multiplexed digital signal. The multiplexed digital signal is demultiplexed to generate multiple digital signals for digital processing. Sharing a receiver and ADC among multiple antennas results in reduced cost and power. Such cost and power reductions in turn enable larger antenna arrays than are available with prior art techniques, thereby promoting increased throughput and coverage.

17 Claims, 6 Drawing Sheets

METHOD AND APPARATUS FOR REAL TIME MULTIPLEXING WITH RECEIVER AND ANTENNA ARRAY ELEMENTS

CROSS-REFERENCE TO RELATED APPLICATION

This application claims priority under 35 U.S.C. §119(e) from Provisional Application Ser. No. 61/352,268, filed Jun. 7, 2010, the entirety of which is hereby incorporated by reference herein.

FIELD

This disclosure is directed generally to communication of broadband signals, and more particularly, some embodiments relate to sharing antennas.

BACKGROUND

In a typical home networking scenario, both high spatial coverage (e.g., coverage to various parts of the home) and high temporal coverage (e.g., coverage nearly 100% of the time) are sought. Wireless communications often experience variations in the temporal coverage, which may be due to interference (in-band or out-of-band) and/or multipath characteristics. Multiple input-multiple output (MIMO) techniques are sometimes used to increase the amount of information that can be communicated within a predetermined time by creating multiple spatial channels through the use of beamforming techniques, e.g., in the IEEE 802.11n standard. In a MIMO system, beamforming, or pointing the reception in a certain direction (or transmission in a transmission system), is accomplished in a similar manner as with a dish antenna. A continuous surface is approximated with a number of smaller antennas. The smaller antennas are nearly collocated and fed with signals of certain phase relationships. The antenna separation is typically on the order of one quarter wavelength at the frequency of operation, e.g., a few inches apart from one another at a WiFi frequency of 5.8 GHz. The various antennas exploit spatial diversity, e.g., using different receive angles. An N×N matrix relating each transmit antenna to each receive antenna is provided in MIMO systems and is well known to one of ordinary skill in the art. If multipath allows for N different independent or uncorrelated paths between a transmitter and a receiver, then N antennas can sustain a maximum of N spatial channels. In such a system, each receive antenna can receive a linear combination of N bitstreams. If the channels are partially correlated, the number of available spatial channels drops. For example, with 50% correlation, half the spatial channels are unavailable. Beamforming is a technique used in MIMO antenna arrays for directional signal transmission or reception, which may increase the link margin and improve the coverage and range. Spatial selectivity is achieved by using adaptive or fixed receive/transmit beam patterns. High spatial selectivity through beamforming is achieved with a large number of antennas located close to one another. The antenna resources can be used to increase the capacity by generating several spatial channels. Alternatively, the antenna resources can be used to increase the coverage by improving the link budget with beamforming. As the number of spatial channels increases, the coverage decreases due to a reduction in the link budget. Accordingly, it can be seen that there is a trade-off between the number of spatial channels and the extent of the coverage.

Current MIMO communication techniques suitable for home networking are limited to up to 4 transmit antennas and 4 receive antennas. This configuration does not provide enough throughput for reliable, high-performance networking in a home environment. For example, future throughput needs are likely to be on the order of 100 Mbps or more. A 4×4 MIMO having two spatial channels and beamforming can provide 100% spatial coverage (i.e. coverage in any place in the home) with a throughput of about 20-30 Mbps. However, less than 90% coverage is typical for a throughput of 50 Mbps or more. Accordingly, in order to get reasonable coverage with at least 100 Mbps, more than four receive antennas are needed (e.g., eight or more receive antennas).

Figure 1:
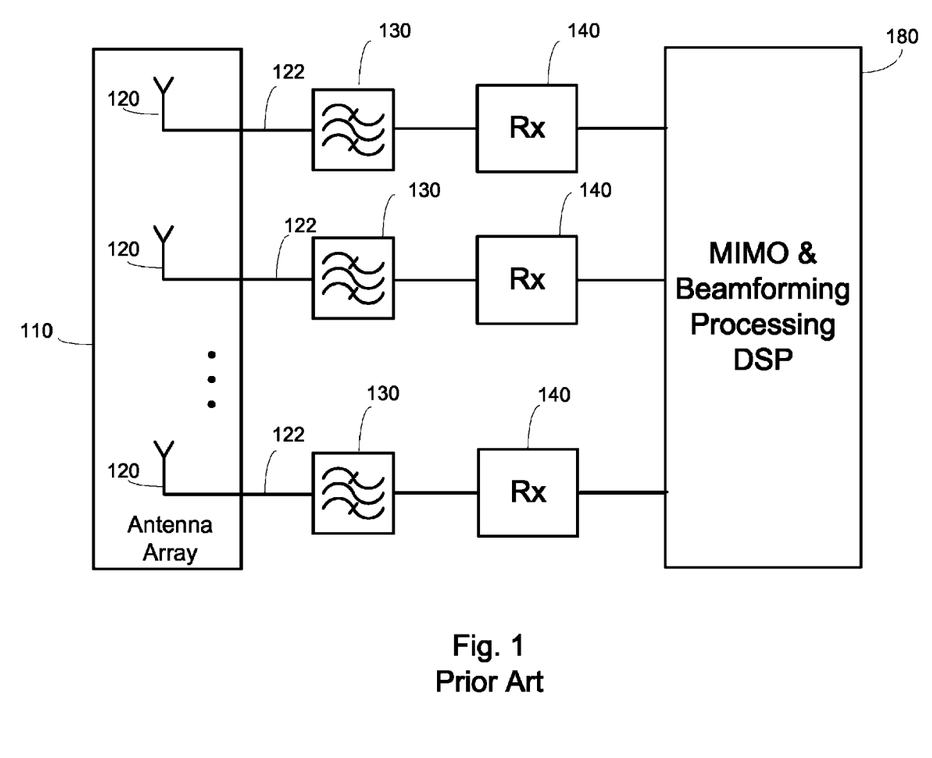
FIG. 1 is a block diagram of a known communication apparatus having an antenna array and a multiplicity of receivers.

In known communication systems involving multiple receiving antennas, each antenna has a dedicated receiver and analog to digital converter (ADC). In the case of zero intermediate frequency (zero-IF, also known as direct conversion architecture), two ADCs are used, one for the in-phase component and one for the quadrature component. For example, FIG. 1 is a block diagram of a known communication apparatus having an antenna array 110 comprising several receive antennas 120 and several receivers 140. The receive antennas 120 are also known as antenna array elements or antenna elements. The receive antennas 120 provide respective analog receive signals 122 that are filtered by respective bandpass filters 130. Each receiver 140 includes an analog to digital converter (ADC) (not shown in FIG. 1). A digital signal processor (DSP) 180 performs processing associated with MIMO spatial multiplexing and beamforming.

Having several receivers and ADCs results in higher cost and power. The cost and power increase proportionally with the number of antenna elements in the array 110. Thus, using arrays that have more than a few receive antennas may be impracticable due to the cost and amount of power required. Therefore, it can be seen that there is a need for an architecture that can provide greater throughput at a lower cost.

SUMMARY

In some embodiments of the disclosed method and apparatus, several analog receive signals are received over several antennas. The antennas are coupled to a multiplexer (mux). The mux selects the antennas one antenna at a time, repeating the process in round robin fashion. Selecting one antenna at a time generates a multiplexed analog signal at the output of the mux. The multiplexed analog signal is filtered to pass a predetermined frequency band. The multiplexed analog signal is sampled using one analog to digital converter (ADC). The output of the ADC is a multiplexed digital signal. The multiplexed digital signal is then demultiplexed to generate multiple digital signals for digital processing.

In some embodiments, a communication apparatus includes multiple antennas, multiple filters, a mux, a receiver, and a digital processing module. The antennas provide analog receive signals to each filter. The mux selects one filtered analog receive signal corresponding to one of the antennas at a time. Thus, mux cycles through the plurality of antennas, and generates a multiplexed analog signal based on the filtered receive signals from respective antennas. The receiver includes an analog to digital converter (ADC) that samples the multiplexed analog signal and generates a multiplexed digital output signal.

In some embodiments, a communication apparatus includes multiple antennas, multiple muxs, multiple receivers, and a digital processing module. The antennas are grouped into multiple antenna groups, with each antenna group including multiple antennas. Each antenna group is associated with a corresponding mux, receiver and demultiplexer. Each mux is coupled to the antennas of a corresponding antenna group. The antennas are selected one at a time by the mux to generate a multiplexed analog signal. The content of the multiplexed analog signal is derived from the signals received by the respective antennas in the corresponding antenna group. Each receiver includes a bandpass filter that filters the multiplexed analog signal output from the corresponding mux. Each receiver also includes an analog to digital converter (ADC) configured to sample the corresponding multiplexed analog signal and generate a multiplexed digital signal. In one embodiment, each receiver is coupled to the same digital processing module. The digital processing module includes all of the demultiplexers. Each demultiplexer is configured to demultiplex the output of a corresponding receiver to generate multiple digital signals for digital processing.

BRIEF DESCRIPTION OF THE DRAWINGS

The disclosed method and apparatus, in accordance with one or more various embodiments, is described with reference to the following figures. The figures are provided for purposes of illustration only and merely depict examples of some embodiments of the disclosed method and apparatus. These figures are provided to facilitate the reader's understanding of the disclosed method and apparatus. They should not be considered to limit the breadth, scope, or applicability of the claimed invention. It should be noted that for clarity and ease of illustration these figures are not necessarily made to scale.

It should be understood that the disclosed method and apparatus can be practiced with modification and alteration, and that the invention should be limited only by the claims.

DETAILED DESCRIPTION

This description of the disclosed embodiments is intended to be read in connection with the accompanying figures, which are to be considered part of the entire written description.

A method and corresponding apparatus is disclosed in which a receiver and an analog to digital converter (ADC) are shared between different antenna elements in real time. Subsequent processing, including interpolation, is performed to achieve time realignment to correct for multiplexing effects. Sharing the receiver and ADC among multiple antennas results in reduced cost and power. It is well known in the semiconductor industry that, while digital circuits scale (reduce in size and power) well with advancing semiconductor technology (reducing geometry size, process or node), the scaling is not as efficient for analog circuitry. Replacing the multiplicity of analog receivers with a single shared receiver thus overcomes this limitation. Such cost and power reductions in turn enable larger antenna arrays.

Figure 2:
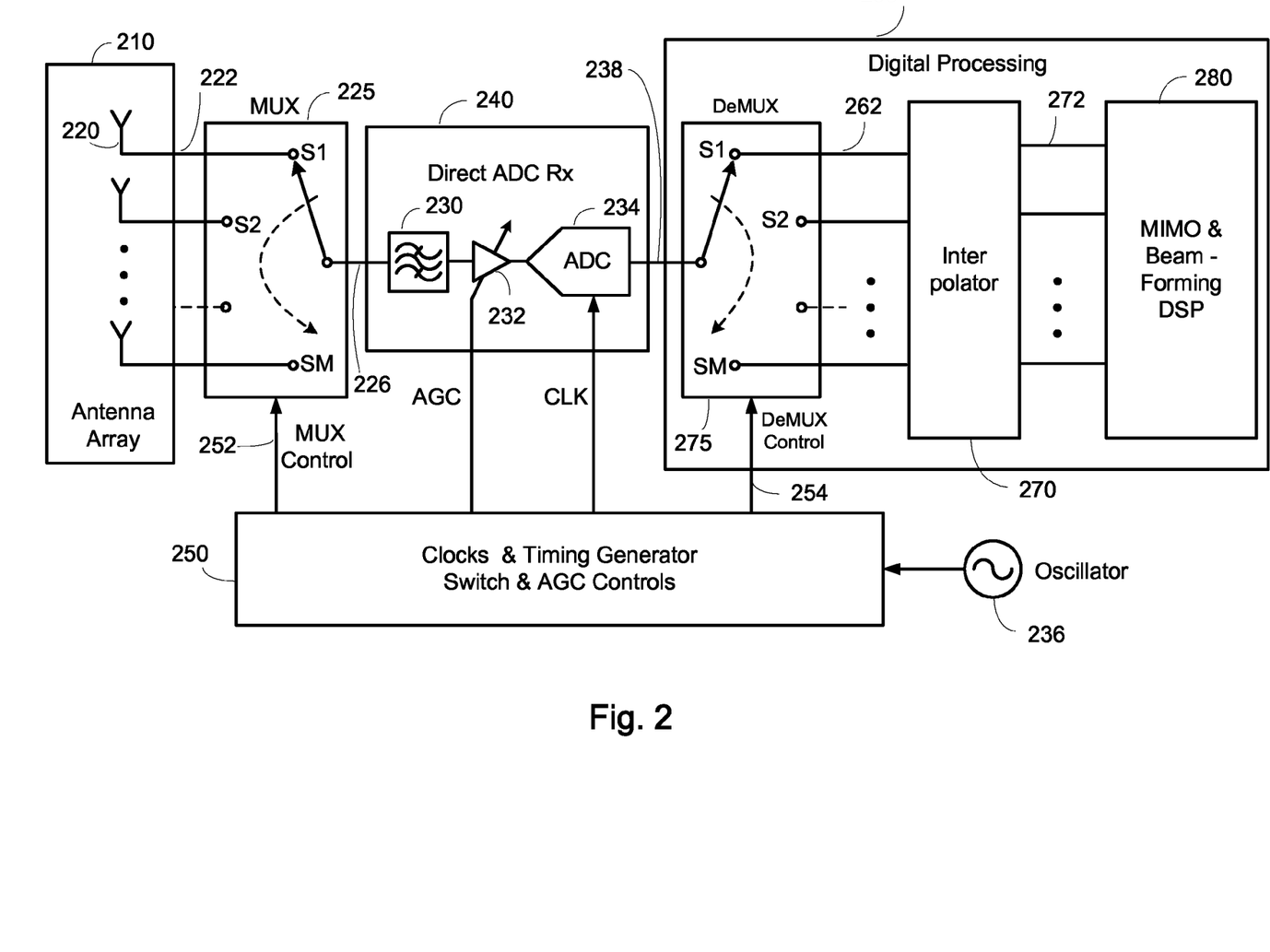
FIG. 2 is a block diagram of a communication apparatus having multiplexed antennas with a direct analog to digital converter (direct ADC) receiver architecture in accordance with some embodiments.

FIG. 2 is a block diagram of a communication apparatus in accordance with one embodiment of the disclosed method and apparatus. An antenna array 210 comprises M receive antennas 220. These receive antennas 220 may also be referred to as antenna elements. Each receive antenna 220 outputs an analog receive signal 222. Unlike the prior art, a dedicated receiver and corresponding ADC are not provided for each antenna. Rather, all the antennas 220 share a single receiver 240 and a single ADC 234 in the receiver. A multiplexer (mux) 225 enables such sharing. The mux 225 is controlled by a mux control signal 252 that is provided by a control module 250. In one embodiment, the control module 250 receives an input from an oscillator 236. Alternatively, other input sources can be used to control the timing of the control module 250.

The control module 250 controls the mux 225 to select one antenna at a time (i.e., to cycle through the antennas 220 in the array 210). The mux 225 has M switch positions labeled 51 through SM in FIG. 2, with corresponding switch positions shown at the demultiplexer 275. Switch positions are labeled similarly in subsequent figures. FIG. 2 shows a point in time at which the mux 225 has selected the first antenna 220. The mux 225 thus provides portions of a receive signal 222 received by the first antenna 220. These portions of the received signal 222 are multiplexed with portions of the signals received by the other antennas 220 within an analog multiplexed signal 226 at the output of the mux 225.

In one embodiment, a bandpass filter 230 is placed after the mux 225 as shown in FIG. 2. The filter 230 has sufficient bandwidth to pass the M switched signals 222 from the respective antennas 210. The exact sampling time of the ADC 234 accounts for the filter delay to ensure sampling at the correct time (i.e., after the switched signal has completely or sufficiently propagated through the filter 230). In another embodiment, a separate filter is inserted in each antenna path, as described further below.

The sampling rate of the ADC 234 is greater than $2*M*BW$, where M is the number of antennas 220 and BW is the signal bandwidth. This is the Nyquist criteria multiplied by the number of antennas, as can be seen by the fact that the ADC 234 must sample each of the M antennas 220 at a rate of at least 2 times the bandwidth of the received signals.

In general, the increased sampling rate noted above is easier to achieve when the signal bandwidth is narrower. For example, in one case the signal has a relatively narrow BW of 40 MHz (such as in Wi-Fi IEEE 802.11n). For M=10 antennas, an equivalent bandwidth of 400 MHz ($M*BW=10*40$ MHz=400 MHz) is sampled with a sampling clock of at least twice that frequency (i.e., a sample rate of at least 800 MHz). This is readily achievable with contemporary ADC technology, assuming the effective number of bits (ENOB) is approximately 8, with a single non-interleaved ADC. The ENOB is a measure of the quality of a digitized signal. Harmonic or bandpass sampling can be used when the signal is in higher Nyquist zones (i.e., when a highest signal frequency is greater than half the sampling clock frequency). In other words, harmonic sampling can be performed when the signal is located near a harmonic frequency of the ADC clock. For example, an 802.11n signal at around 5.8 GHz can be sampled with a $6^{th}$ harmonic of an ADC clock that has a fundamental frequency of approximately 1 GHz.

To optimize the dynamic range and performance of the receiver 240, an automatic gain control circuit 232 is inserted into the signal path in one embodiment. The automatic gain control circuit 232 may be dynamically switched and synchronized to the mux sampling rate to take into account the particular strength of the signal received by each antenna element 220. The automatic gain control circuit 232 is shown in FIG. 2 as being disposed between the filter 230 and the ADC 234, but it may be disposed between the mux 225 and the filter 230. In one such embodiment in which the automatic gain control circuit 232 is between the mux 225 and filter 230, a better impedance is presented to the antenna and a better source impedance is presented to the filter. However, this comes at the expense of a potentially higher dynamic range requirement in the amplifier which will have to handle more out of band (un-filtered) energy coming from the antennas.

Throughout this disclosure, the term "multiplexed analog signal" may refer to the output 226 of the mux, the output of the filter 230, or the output of the automatic gain control circuit 232, since filtering a signal or varying its gain does not change the analog nature of a signal or its multiplexed nature. The output of the ADC 234 is referred to as a multiplexed digital signal 238.

The ADC sampling clock signal (CLK) and control signals 252, 254 for the mux 225 and a demultiplexer 275 (discussed further below), respectively, are coherent and time synchronized/aligned for proper routing and sampling. The control module 250 provides the necessary clocking and timing, and generates control signals 252, 254 as well as the control signal (AGC) that controls the automatic gain control circuit 232. Once the functionality of the control module is understood from the present disclosure, implementation details necessary to implement such a control module will be well known to those of ordinary skill in the art.

In some embodiments, as the mux 225 cycles through its positions, at any given time only one antenna 220 is active and terminated (e.g., coupled to the ADC 234). All other antennas 220 (i.e., the other M−1 antennas) are inactive and opened (i.e., floating and not loaded into a termination). Because of floating conditions, all non-active antenna elements exert less loading effect on the selected (active) element, in spite of the mutual coupling that may exist between the elements. This effectively isolates the active antenna element from all other antenna elements. The increased isolation between the antenna elements 220 effectively enhances the MIMO performance of the antenna array 210.

The architecture of the apparatus in FIG. 2 is referred to as a direct ADC receiver architecture because the ADC samples the multiplexed analog signal 226 directly without prior downconversion to a lower intermediate frequency (IF).

After conversion to digital format (i.e., after sampling), the ADC output data stream (the multiplexed digital signal 238) is demultiplexed at the demultiplexer 275, extracting respective antenna signals into separate digital signals 262. In one embodiment, all of the digital signals (digital streams) are interpolated by an interpolator 270 to align the timing between different antenna elements 220. The interpolator 270 provides multiple interpolated digital streams 272 containing interpolated samples. The interpolator 270 is described in greater detail below in the context of FIG. 5. Each stream 272 may be processed in a digital signal processor (DSP) 280 which performs MIMO spatial multiplexing and beamforming functions. The time alignment in the interpolator may include aligning ADC samples of all antenna elements 220 to the same time. Then, the DSP performs the MIMO and beamforming optimization algorithms. These may include time shifting, such as delaying or advancing the individual digital antenna streams. In another embodiment (not shown in FIG. 2), the interpolation of samples from different antenna elements 220 may be integrated in the DSP as part of the MIMO/beamforming algorithms, i.e. the function of the interpolator 270 is performed by the DSP 280.

Figure 3:
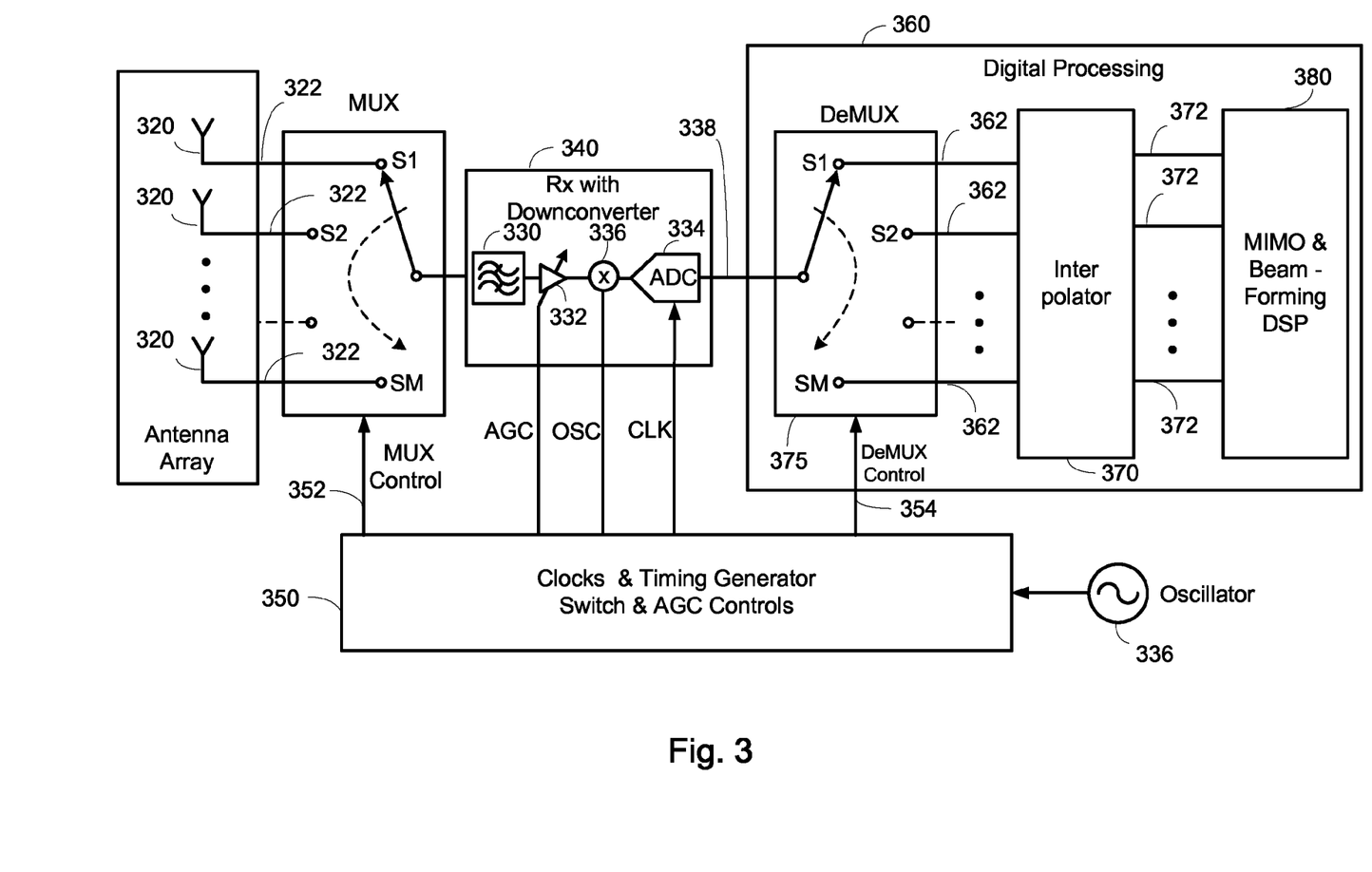
FIG. 3 is a block diagram of a communication apparatus having multiplexed antennas with a downconverter ADC receiver architecture in accordance with some embodiments.

FIG. 3 is a block diagram of a communication apparatus having multiplexed antennas 320 with a downconverter ADC receiver architecture. In this embodiment, the multiplexed analog signal is first downconverted (mixed down) to a lower IF frequency (or zero-IF) and then sampled with one or more ADCs. Conventional sampling (as opposed to harmonic sampling) may be used with a downconverter ADC receiver architecture. Several aspects of the apparatus in FIG. 3 are similar to those of the apparatus in FIG. 2, so only differences are discussed below for brevity. Like reference characters are assigned to like elements (relative to FIG. 2), with a leading digit "3" instead of "2", e.g., antenna array 310 compared to antenna array 210 of FIG. 2. The downconverter ADC receiver architecture is so named because a receiver 340 in FIG. 3 includes a downconverter (mixer) 336 prior to an ADC 334. In embodiments including an optional automatic gain control circuit 332, the downconverter 336 is located between the automatic gain control circuit and the ADC (as shown in FIG. 3). Another AGC controller (not shown in FIG. 3) may be inserted between downconverter 336 and ADC 334, to increase dynamic range, if needed. The downconverter 336 receives a local oscillator signal OSC from a control module 350. Further discussion of the other elements of FIG. 3 is not necessary, as such elements will be understood in light of the discussion above regarding FIG. 2.

Figure 4:
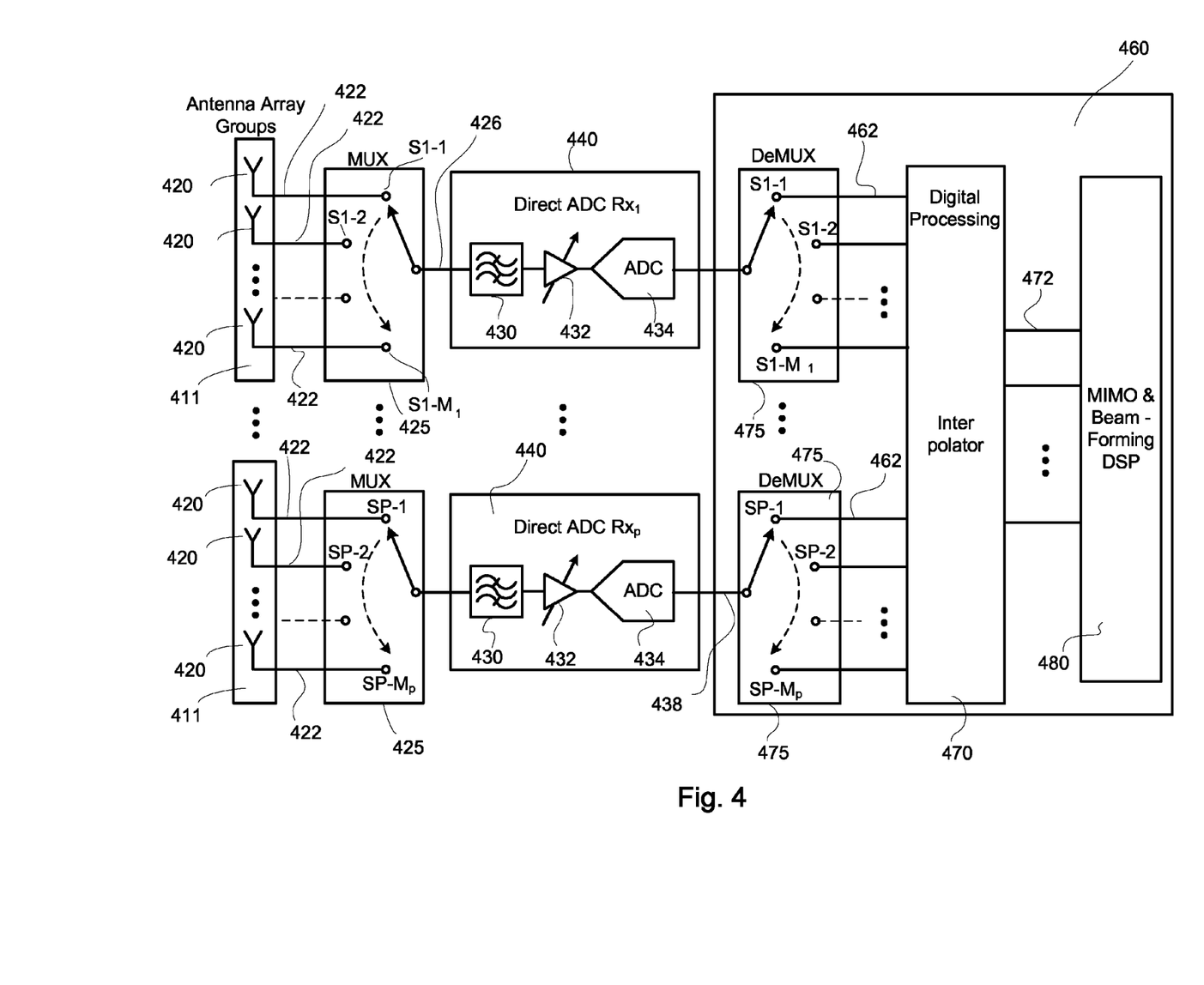
FIG. 4 is a block diagram of a communication apparatus having antenna array groups and multiple receivers and ADCs in accordance with some embodiments.

FIG. 4 is a block diagram of a communication apparatus having antenna array groups 411, multiple muxs 425 and multiple receivers 440, each receiver comprising one ADC 434 in accordance with some embodiments. Several aspects of the apparatus in FIG. 4 are similar to those of the apparatuses in FIGS. 2-3, so only differences are discussed below for brevity. In FIG. 4, antennas 420 are grouped into P subsets. Each subset forms an antenna array group 411. Each antenna array group 411 uses one receiver 440 comprising one ADC 434. The number of antennas in each group may be optimized to match the ADC capabilities, and/or vice versa. Thus, the antenna groups 411 may have different numbers of antennas 420. One mux 425 is associated with each antenna group 411. Multiple receivers 440 are coupled to outputs of respective muxs 425. FIG. 4 shows receivers 440 in a direct ADC architecture; the receivers 440 may have a downconverter ADC receiver architecture in another embodiment. A digital processing module 460 includes P demultiplexers 475 coupled to respective ADCs 434. Each demultiplexer 475 generates multiple digital signals at its output, where the number of digital signals corresponds to the number of inputs to a corresponding mux 425.

In one embodiment, an interpolator 470 receives the digital signals from all the demultiplexers 475 and performs interpolation to align the samples taken by the ADCs 434 to a common time. The interpolator 470 provides multiple interpolated digital streams 472 containing interpolated samples. In one example, there are K total antennas in all the antenna groups 411, and thus K digital streams 472.

In some embodiments (not shown), individual filters are provided for each antenna 420. In the case of the architecture shown in FIG. 2, the filters are provided between each antenna 220 and the mux 225. Individual filters may also be provided in a downconverter ADC receiver architecture, as in FIG. 3 or a grouped configuration, as in FIG. 4. Using individual filters may eliminate the need for a filter 230, 330, 430 within the receiver. In other embodiments, individual filters are provided for each antenna and a common filter is also provided at a receiver. This enables the individual filters to have a lower order than they would ordinarily have and the common filter to have a wider bandwidth and/or lower order than it would ordinarily have. Thus, a common filter in this case may have a bandwidth wider than M*BW, where M is the number of antennas and BW is the signal bandwidth, and still provide overall sufficient filtering.

Higher order filters have steeper transition bands and longer delays than lower order filters. Using lower order filters for individual filters corresponding to respective antennas promotes speed and reduces circuit complexity and cost. Using individual filters and eliminating the common filter (or using individual filters with a wider common filter) as described above may provide higher analog signal level to the ADC, compared with the case when the common filter is used. This is because with the embodiment using the common filter 230 (e.g. as shown in FIG. 2) the MUX switches or "chops" the signal waveform, thus spreading the signal energy around the spectral components of the switching waveform. At the output of the common filter, the out of band energy will be suppressed (the amount of suppression depending on the filter BW and switching speed). Only the in-band portion of the signal will pass through the filter, thus reducing the analog signal level presented to the ADC for conversion. In one embodiment, without the common filter, the full signal energy is preserved and applied to the ADC.

In some embodiments, the order of magnitude of the sampling time at an ADC is inversely proportional to the bandwidth of an antenna. Switching between various antennas may occur fast enough to take into account the settling time of energy transmitted across a multiplexed link.

When a mux (e.g., muxs 225, 325, or any of muxs 425) has selected a given antenna 220, 320, 420 an ADC 234, 334, 434 may sample the signal from the given antenna 220, 320, 420 multiple times, assuming the ADC 234, 334, 434 is fast enough. In one embodiment, such an ADC 234, 334, 434 samples the signal from the given antenna 220, 320, 420 multiple times even before a corresponding filter 230, 330, 430 has settled. Such multiple sampling is enabled by knowledge of a settling trajectory. Effects resulting from such pre-settled multiple sampling may be compensated for during subsequent digital processing. In one such embodiment, the value of each sample is digitally corrected by an amount equal to the "unsettled portion" of the signal at the sample time, resulting in the output being equal to the full, correct value of the signal. The "unsettled portion" is computed based on the model (a formula or a look-up table stored in the memory) of the settling behavior of the filter. The model of the filter may be obtained by simulations and/or measurements/characterization of the filter.

Figure 5:
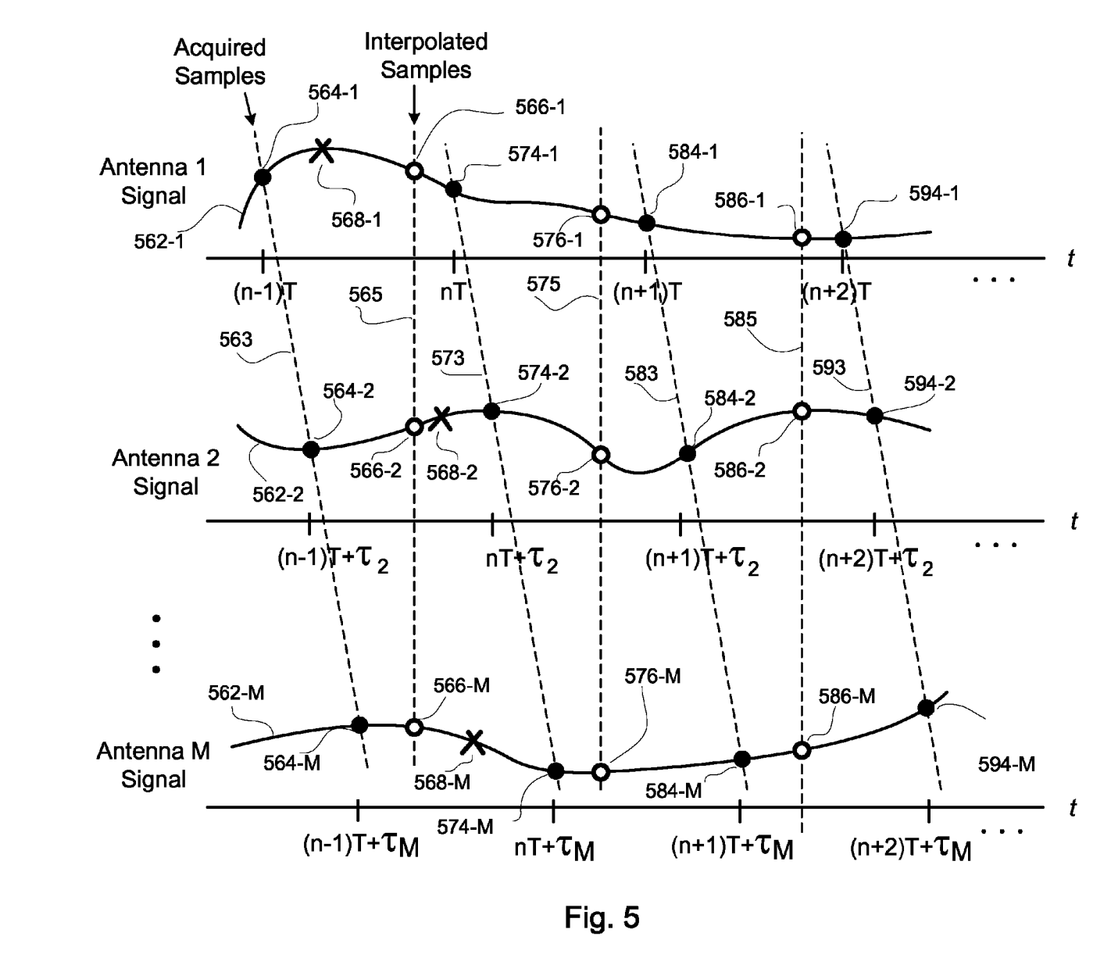
FIG. 5 is a signal diagram illustrating interpolation with demultiplexed samples to align timing for all antennas in accordance with some embodiments.

FIG. 5 is a signal diagram illustrating interpolation with demultiplexed samples to align the timing for all of the antennas in accordance with some embodiments. FIG. 5 shows the amplitudes of the signals 562-1 through 562-M (collectively 562) corresponding to M receive antennas 220 or 320 or 420, e.g., as in FIG. 2 or 3 or 4. In one embodiment, the signals 562 are the analog receive signals 222 or 322 or 422 shown in FIG. 2 or 3 or 4. Acquired samples 564, 574, 584, and 594 are taken by the ADC 234 or 334 or 434 at times indicated along the dashed lines 563, 573, 583, and 593 at the intersections between these dashed lines 563, 573, 583, and 593 and the signals 562. These samples are output from a demultiplexer (e.g., demultiplexers 275 or 375 or 475 in FIG. 2 or 3 or 4). The samples 564, 574, 584, and 594 are shown as filled-in points in FIG. 5. A sample period T is shown in FIG. 5. Thus, samples 564-1, 574-1, 584-1, and 594-1 occur at times (n−1)T, nT, (n+1)T, (n+2)T, etc.

Unlike the prior art technique of FIG. 1, the presently disclosed techniques involving multiplexing result in digital samples corresponding to different antennas being taken at different times. Thus, the first sample 564-1 of the signal from the first antenna is obtained at a time (n−1)T. The first sample 564-2 of the signal from the second antenna is obtained at a time (n−1)T+$\tau_2$ (i.e., offset from the first sample time of the first antenna by $\tau_2$) and a first sample 564-M for an $M^{th}$ antenna is obtained at a time (n−1)T+$\tau_M$ (offset from the first sample time of the first antenna by $\tau_M$). It is noted that for consistency of notation, the sample time (n−1)T (i.e., the time at which the signal from the first antenna is sampled) may be expressed as (n−1)T+$\tau_1$, where $\tau_1$=0, since the offset $\tau_1$ is relative to the time the sample of the signal from the first antenna is taken. The spacing between adjacent $\tau_i$ values (with i ranging between 1 and M) may be uniform (i.e., the acquired samples may lie along lines like the dashed lines of FIG. 5) or non-uniform. In the latter case, the digital signals are said to be shifted in time relative to one another by non-uniform time offsets. Such non-uniform time offsets may be employed in a manner akin to spread spectrum techniques, to obtain the benefit of a smallest sampling interval.

In some embodiments, an interpolator (e.g., interpolators 270, 370, or 470) aligns the digital samples to a common reference time, e.g., a time denoted by dashed lines 565, 575, 585. Various interpolation techniques (e.g., linear or higher-order interpolation) may be used to provide interpolated samples 566, 576, 586, shown as holes (open circles) in FIG. 5. An interpolation technique that provides adequate performance (as determined theoretically, by simulation, by testing or by some other means known in the art) may be used. Interpolation in this manner restores the data to a condition similar to the prior art in the sense that data from various antennas are available at common times 565, 575, 585. Then, MIMO and beamforming processing may process the interpolated samples, e.g., by modulating the interpolated samples in phase and amplitude, to yield data points 568-1, 568-2, . . . , 568-M shown as crosses in FIG. 5 (which is equivalent to delaying or advancing the waveform by an amount equal to the distance in time between the crosses and holes in FIG. 5). In some embodiments, a separate interpolator is not used. Rather, a digital signal processor (DSP) directly translates acquired samples 564-1, 564-2, . . . , 564-M to data points 568-1, 568-2, 568-M, bypassing (i.e., eliminating) the stage of providing interpolated samples at time 565.

Figure 6:
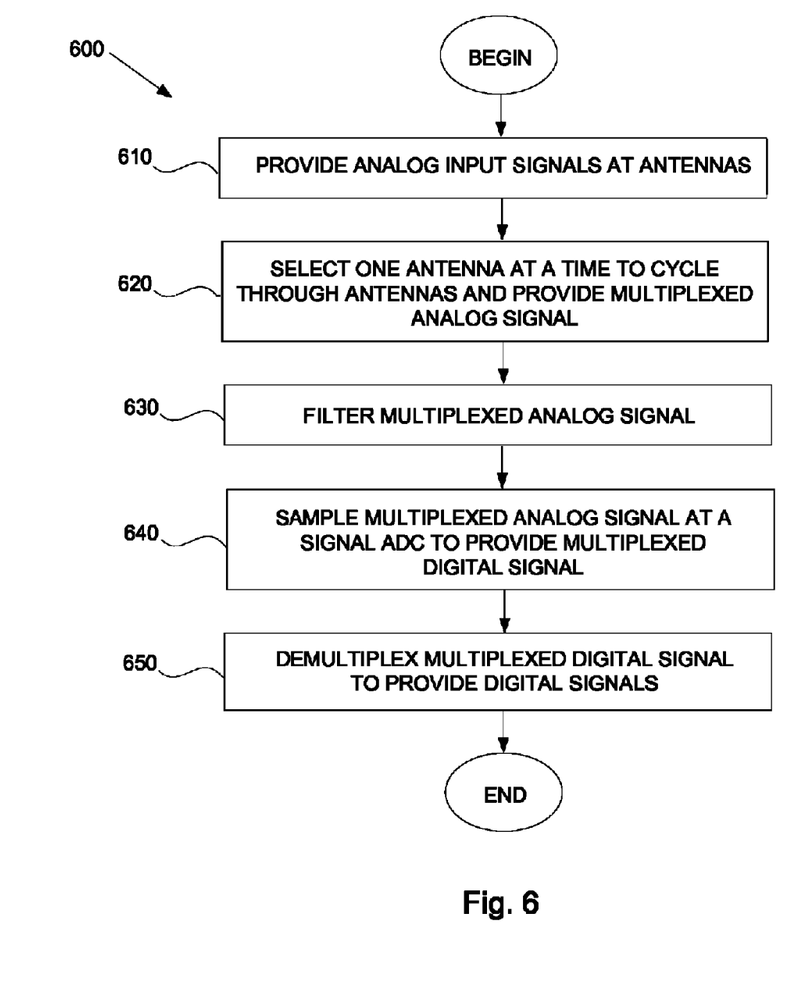
FIG. 6 is a flow diagram in accordance with an embodiment.

FIG. 6 is a flow diagram in accordance with one embodiment of the disclosed method and apparatus. After process 600 begins, a plurality of analog receive signals are provided (610) at respective ones of a plurality of antennas. One of the antennas is selected (620) at a time among a plurality of times, to cycle through the plurality of antennas and generate a multiplexed analog signal. The multiplexed analog signal is filtered (630) at a filter to pass a predetermined frequency band. The multiplexed analog signal is sampled (640) at a single analog to digital converter to generate a multiplexed digital signal. The multiplexed digital signal is demultiplexed (650) to generate a plurality of digital signals for digital processing. Repeat the process 600.

Various embodiments find broad applicability in a variety of networking contexts, generally anywhere that MIMO communication is used. For example, various embodiments may be employed in wireless communication systems as well as wireline communication systems such as home networking system utilizing power lines.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of signal processing, comprising:
   a) receiving a plurality of analog receive signals, each such analog receive signal being received by a corresponding one of a plurality of antennas;
   b) switching a switch to select from one antenna at a time a corresponding one of the plurality of analog receive signals to generate a multiplexed analog signal;
   c) filtering the multiplexed analog signal at a filter to pass a predetermined frequency band;
   d) controlling a gain of the multiplexed analog signal automatically to account for a received signal strength of each antenna, wherein the step of controlling the gain is synchronized to the step of selecting;
   e) sampling the multiplexed analog signal at an analog to digital converter to generate a multiplexed digital signal; and
   f) demultiplexing the multiplexed digital signal to generate a plurality of digital signals for digital processing.

2. The method of claim 1, further comprising downconverting the multiplexed analog signal to an intermediate frequency (IF) prior to sampling.

3. The method of claim 1, further comprising:
   a) aligning each digital signal to a common sample time to provide a plurality of interpolated samples corresponding to respective antennas; and
   b) performing multiple input multiple output (MIMO) spatial multiplexing and beamforming on the interpolated samples.

4. The method of claim 1, further comprising modulating each digital signal in phase and amplitude to perform multiple input multiple output (MIMO) spatial multiplexing and beamforming.

5. The method of claim 1, wherein sampling comprises harmonically sampling.

6. The method of claim 1, wherein the digital signals are shifted in time relative to one another by non-uniform time offsets.

7. The method of claim 1, further comprising electrically terminating only the selected antenna among the plurality of antennas, and electrically opening the other antennas.

8. The method of claim 1, wherein sampling comprises sampling the multiplexed analog signal to provide multiple samples while the one antenna is selected and before another antenna is selected.

9. The method of claim 8, wherein the multiple samples are provided for the one selected antenna before the filter reaches a settled state, the method further comprising compensating the multiplexed digital signal based on a known settling trajectory.

10. A communication apparatus comprising:
a) a plurality of antennas configured to provide respective ones of a plurality of analog receive signals;
b) a multiplexer configured to:
i) switch to select one of the antennas at a time a plurality of times, to cycle through the plurality of antennas to select respective ones of the analog receive signals, and
ii) generate a multiplexed analog signal based on the analog receive signals from the respective selected antennas;
c) a receiver comprising:
i) a bandpass filter configured to filter the multiplexed analog signal by passing a predetermined frequency band,
ii) a gain control circuit configured to automatically adjust a gain of the multiplexed analog signal to account for a received signal strength of each antenna, wherein the gain control circuit is synchronized to the multiplexer to automatically control the gain of the multiplexed analog signal, and
iii) an analog to digital converter (ADC) configured to sample the multiplexed analog signal and generate a multiplexed digital signal; and
d) a digital processing module comprising a demultiplexer configured to demultiplex the multiplexed digital signal to generate a plurality of digital signals for digital processing.

11. The apparatus of claim 10, wherein the receiver further comprises a mixer and a local oscillator, the mixer configured to downconvert the multiplexed analog signal to an intermediate frequency (IF) prior to sampling by the ADC.

12. The apparatus of claim 10, wherein the digital processing module further comprises:
a) an interpolator configured to align each digital signal to a common sample time to provide a plurality of interpolated samples corresponding to respective antennas; and
b) a digital signal processor configured to perform multiple input multiple output (MIMO) spatial multiplexing and beamforming on the interpolated samples.

13. The apparatus of claim 10, wherein the digital processing module further comprises a digital signal processor configured to modulate each digital signal in phase and amplitude to perform multiple input multiple output (MIMO) spatial multiplexing and beamforming.

14. A communication apparatus comprising:
a) a plurality of antennas configured to provide respective ones of a plurality of analog receive signals;
b) a plurality of filters, each filter configured to filter the analog receive signal of a corresponding antenna;
c) a multiplexer configured to:
i) switch to select one at a time a filtered analog receive signal corresponding to a respective one of the antennas, and to cycle through the plurality of antennas a plurality of times, and
ii) generate a multiplexed analog signal based on the filtered receive signals from the respective antennas;
d) a receiver comprising a gain control circuit configured to automatically adjust a gain of the multiplexed analog signal to account for a received signal strength of each antenna, wherein the gain control circuit is synchronized to the multiplexer to automatically control the gain of the multiplexed analog signal, and an analog to digital converter (ADC) configured to sample the multiplexed analog signal and generate a multiplexed digital signal; and
e) a digital processing module comprising a demultiplexer configured to demultiplex the multiplexed digital signal to generate a plurality of digital signals for digital processing.

15. The apparatus of claim 14, wherein the receiver further comprises a bandpass filter configured to filter the multiplexed analog signal, the bandpass filter of the receiver having a bandwidth wider than a product of the number of antennas and a bandwidth of one of the plurality of filters.

16. A communication apparatus comprising:
a) a plurality of antennas grouped into multiple antenna groups, each antenna group comprising multiple antennas, the antennas configured to provide respective ones of a plurality of analog receive signals;
b) a plurality of multiplexers, each multiplexer configured to:
i) switch to select one at a time the antennas of a corresponding antenna group a plurality of times, to cycle through the antennas of the corresponding antenna group to select respective ones of the analog receive signals, and
ii) generate a multiplexed analog signal among a plurality of multiplexed analog signals based on the receive signals from respective antennas in the corresponding antenna group;
c) a plurality of receivers, each receiver comprising:
d) a bandpass filter configured to filter a corresponding multiplexed analog signal by passing a predetermined frequency band,
e) a gain control circuit configured to automatically adjust a gain of the multiplexed analog signal to account for a received signal strength of each antenna, wherein the gain control circuit is synchronized to the corresponding multiplexer to automatically control the gain of the multiplexed analog signal;
f) an analog to digital converter (ADC) configured to sample the corresponding multiplexed analog signal and generate a multiplexed digital signal among a plurality of multiplexed digital signals; and
g) a digital processing module comprising a plurality of demultiplexers, each demultiplexer configured to demultiplex a corresponding multiplexed digital signal to generate a plurality of digital signals for digital processing.

17. The apparatus of claim 16, wherein the digital processing module further comprises:
a) an interpolator configured to align the digital signals in respective pluralities generated by the demultiplexers to a common sample time to provide a plurality of interpolated samples corresponding to respective antennas; and
b) a digital signal processor configured to perform multiple input multiple output (MIMO) spatial multiplexing and beamforming on the interpolated samples.

* * * * *